(12) United States Patent
Hirschauer et al.

(10) Patent No.: US 12,286,022 B2
(45) Date of Patent: Apr. 29, 2025

(54) SYSTEM FOR CONDUCTIVELY CHARGING A MOTOR VEHICLE

(71) Applicant: KOSTAL Automobil Elektrik GmbH & Co. KG, Luedenscheid (DE)

(72) Inventors: Christian Hirschauer, Schwelm (DE); Georg Schroeder, Drolshagen (DE); Herwig Rilling, Kamen (DE); Uwe Pitzul, Hagen (DE); Klaus Hirschfeld, Luedenscheid (DE); Robin Perlick, Werdohl (DE); Christina Koenig, Hagen (DE)

(73) Assignee: KOSTAL Automobil Elektrik GmbH & Co. KG, Luedenscheid (DE)

(*) Notice: Subject to any disclaimer, the term of this patent is extended or adjusted under 35 U.S.C. 154(b) by 623 days.

(21) Appl. No.: 17/688,955

(22) Filed: Mar. 8, 2022

(65) Prior Publication Data
US 2022/0194243 A1   Jun. 23, 2022

Related U.S. Application Data

(63) Continuation of application No. PCT/EP2020/080912, filed on Nov. 4, 2020.

(30) Foreign Application Priority Data

Nov. 7, 2019   (DE) .................... 10 2019 007 712.1

(51) Int. Cl.
*B60L 53/35* (2019.01)
*B60L 53/16* (2019.01)
*H02J 7/00* (2006.01)

(52) U.S. Cl.
CPC ............... *B60L 53/35* (2019.02); *B60L 53/16* (2019.02); *H02J 7/0042* (2013.01)

(58) Field of Classification Search
None
See application file for complete search history.

(56) References Cited

U.S. PATENT DOCUMENTS

| | | | |
|---|---|---|---|
| 10,543,753 B2 * | 1/2020 | Wechsler | .............. H02J 50/90 |
| 2005/0255719 A1 * | 11/2005 | Heidlein | .............. H01R 13/24 |
| | | | 439/39 |

(Continued)

FOREIGN PATENT DOCUMENTS

| | | |
|---|---|---|
| DE | 102012004292 A1 | 9/2013 |
| DE | 102017115224 A1 | 1/2019 |

(Continued)

OTHER PUBLICATIONS

European Patent Office, International Search Report for International Application No. PCT/EP2020/080912, mailed Feb. 8, 2021.

(Continued)

*Primary Examiner* — Julian D Huffman
*Assistant Examiner* — Sadia Kousar
(74) *Attorney, Agent, or Firm* — Brooks Kushman P.C.

(57) ABSTRACT

A system for conductively charging a motor vehicle includes a charging device and a receiving device. The charging device has an electrical contacting unit and a lifting device operable for axially moving the contacting unit between retracted and extended positions. The receiving device has a receiving chamber for receiving the contacting unit inserted therein when the contacting unit is moved to an extended position. The contacting unit has a cylindrical or truncated cone body and includes an electrical contact ring extending around a lateral surface of the body of the contacting unit. The receiving device includes a radially position-able electrical contact element along the receiving chamber. When the contact element is in one radial position while the contacting unit is inserted into the receiving chamber the contact element electrically contacts the contact ring and (Continued)

mechanically fixes the contacting unit to the receiving device inside the receiving chamber.

18 Claims, 6 Drawing Sheets

(56) References Cited

U.S. PATENT DOCUMENTS

| | | | |
|---|---|---|---|
| 2015/0333457 A1* | 11/2015 | Liu | H01R 13/7037 335/208 |
| 2020/0164758 A1* | 5/2020 | Flechl | B60L 53/16 |
| 2020/0269713 A1 | 8/2020 | Hakenberg | |
| 2021/0101493 A1 | 4/2021 | Ewald et al. | |

FOREIGN PATENT DOCUMENTS

| | | |
|---|---|---|
| DE | 102018205594 A1 | 3/2019 |
| DE | 102019000151 A1 | 8/2019 |
| DE | 102018204820 A1 | 10/2019 |
| EP | 2039557 A1 | 3/2009 |
| EP | 2928023 A1 | 10/2015 |

OTHER PUBLICATIONS

German Patent and Trademark Office, German Search Report for corresponding German Patent Application DE 10 2019 007 712.1 dated Jul. 6, 2020.

The International Bureau of WIPO, International Preliminary Report on Patentability for International Application No. PCT/EP2020/080912 issued May 10, 2022.

* cited by examiner

SYSTEM FOR CONDUCTIVELY CHARGING A MOTOR VEHICLE

CROSS-REFERENCE TO RELATED APPLICATIONS

This application is a continuation of International Application No. PCT/EP2020/080912, published in German, with an international filing date of Nov. 4, 2020, which claims priority to DE 10 2019 007 712.1, filed Nov. 7, 2019, the disclosures of which are incorporated in their entirety by reference herein.

TECHNICAL FIELD

The present invention relates to a system for conductively charging a motor vehicle, the system including a charging device having a motor-adjustable lifting device and an electrical contacting unit, the lifting device being designed as a scissor lift table that is able to vertically position the electrical contacting unit, and the system further including a receiving device, situated at the motor vehicle, for receiving the electrical contacting unit.

BACKGROUND

For years, professionals in the field have dealt with the issue of automated charging of electrically powered motor vehicles, as users are not particularly comfortable with handling a cumbersome, dirty cable. Over the years, various universities have proposed solutions to the problem by combining a standard charging column, including a plug, with a multiaxial robot that takes over the task of inserting the charging plug. However, these solutions at best are of interest for large fleets, but for the end user they are simply too complicated and expensive.

In addition, in recent years there have been approaches for inductive energy transfer, but these have not become established due to safety concerns or high expenditures of effort and money. The general trend appears to be in the direction of conductive charging.

A charging device is known from German published patent application DE 10 2019 000 151 A1. This charging device has an electrical contact element arranged on a movable platform of a motor-adjustable scissor lift table. The contact element may be vertically positioned by the scissor lift table.

A disadvantage of this charging device is that the contact element has an open arrangement and is therefore sensitive to environmental influences and in particular soiling. This may impair the functional capability of the contact element.

A further problem may arise in the event of a power failure. The contact elements of the charging device and of the motor vehicle, connected to one another by the charging device, remain mechanically connected after a power failure. In this case, driving the motor vehicle away is not possible or is at least hampered, as there is a risk of damage to the contact elements.

SUMMARY

An object is to provide a generic conductive charging device that does not have the above-mentioned disadvantages.

In embodiments, a system for conductively charging a motor vehicle includes a charging device (or apparatus) and a receiving device (or apparatus). The charging device includes a lifting device and an electrical contacting unit. The lifting device is operable for vertically positioning the contacting unit. The lifting device is designed as a scissor lift table that is adjustable by a motor to extend and retract to vertically position the contacting unit. The receiving device is arranged on the motor vehicle and is for receiving the contacting unit.

The contacting unit is in the shape of a cylinder or a truncated cone. The contacting unit has, running around its lateral surface, a plurality of electrical contact rings. The receiving device has a receiving chamber for receiving the contacting unit. The receiving chamber of the receiving device receives the contacting unit when the contacting unit is vertically positioned into the receiving chamber of the receiving device.

The receiving device includes a plurality of radially position-able electrical contact elements around the receiving chamber. The contact elements of the receiving device, in one radial position, make electrical contact with the contact rings of the contacting unit inserted in the receiving chamber and, at the same time, mechanically fix the contacting unit to the receiving device inside the receiving chamber. The position of the contact elements of the receiving device is controllable by a vehicle-side controller. The charging device further has means with which the charging device can mechanically preload the contacting unit fixed in the receiving chamber of the receiving device in an axial direction.

Embodiments of the present invention achieve the above object and/or other objects in that an essentially cylindrical or truncated conical electrical contacting unit is provided, which is lifted by a motor-adjustable lifting device, designed as a scissor lift table, beneath a motor vehicle until the contacting unit enters into a receiving chamber of a receiving device situated at the bottom side of the motor vehicle.

Furthermore, it is provided that the receiving device has multiple radially position-able electrical contact elements around the receiving chamber. When the contact elements are in one position while the contacting unit is inserted into the receiving chamber of the receiving device, the contact elements of the receiving device electrically contact electrical contact elements of the contacting unit and mechanically fix the contacting unit to the receiving device within the receiving chamber. The position of the contact elements of the receiving device is controlled by a controller on the motor vehicle side, so that the receiving device plays an active role in the mechanical and electrical connection and disconnection.

It is provided to design the electrical contact elements of the contacting unit as electrical contact rings and to situate them vertically one on top of the other. Due to the rotationally symmetrical arrangement of the contact rings, upon joining to the mating contact elements of the motor vehicle any relative rotational position between the contacting unit and the motor vehicle is suitable for establishing an electrical connection, so that no particular rotational orientation between the charging device and the motor vehicle is necessary.

It is further provided that the charging device has means via which the charging device can mechanically pretension the contacting unit, fixed in the receiving device, in an axial direction. As a result, it is also possible to disconnect the receiving device from the charging device even in the event of a malfunction or a power failure.

For this purpose, the contacting unit may advantageously be connected to the lifting device via at least one elastic element, for example one or more springs.

It is likewise advantageous that the mechanical pretensioning may be produced by a mechanical decoupling of a scissor lever from a carriage that moves the scissor lift table.

It is particularly advantageous when the contacting unit is movable with respect to the lifting device by a swivel lever that is coupled to the scissor levers of the lifting device. As a result, when the scissor lift table is lowered, the contacting unit may be easily retracted into the platform of the scissor lift table. When the charging system is not in use, the contacting unit is thus situated so that it is protected from harmful environmental influences. The same swivel lever, in interaction with the elastic elements, enables an advance extension of the contacting unit when the scissor lift table is raised, thus allowing a flat design of the floor-mounted system.

BRIEF DESCRIPTION OF THE DRAWINGS

An exemplary embodiment of a system for conductively charging a motor vehicle in accordance with the present invention is illustrated and explained in greater detail below with reference to the drawings, which include the following.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to the FIGS., an exemplary embodiment of a system for conductively charging a motor vehicle in accordance with the present invention will be described. The system includes a charging device 100 and a receiving device 300. Charging device 100 includes a lifting device 101 and an electrical contacting unit 200. Lifting device 101 is operable for vertically positioning contacting unit 200. Lifting device 101 is designed as a scissor lift table that is adjustable by a motor (not shown) to extend and retract to vertically position contacting unit 200. Receiving device 300 is arranged on the motor vehicle (not shown) and is for receiving contacting unit 200.

Contacting unit 200 has a plurality of electrical contact rings 201. Receiving device 300 has a receiving chamber 301 for receiving contacting unit 200. Receiving chamber 301 receives contacting unit 200 when the contacting unit is vertically positioned into the receiving chamber.

Receiving device 300 includes a plurality of radially position-able electrical contact elements 302 around receiving chamber 301. Contact elements 302 of receiving device 300, in one radial position, make electrical contact with contact rings 201 of contacting unit 200 inserted in receiving chamber 301 and, at the same time, mechanically fix contacting unit 200 to receiving device 300 inside receiving chamber 301. The position of contact elements 302 of receiving device 300 is controllable by a vehicle-side controller (not shown). Charging device 100 further has means with which the charging device can mechanically preload contacting unit 200 fixed in receiving chamber 301 of receiving device 300 in an axial direction.

Figure 5:
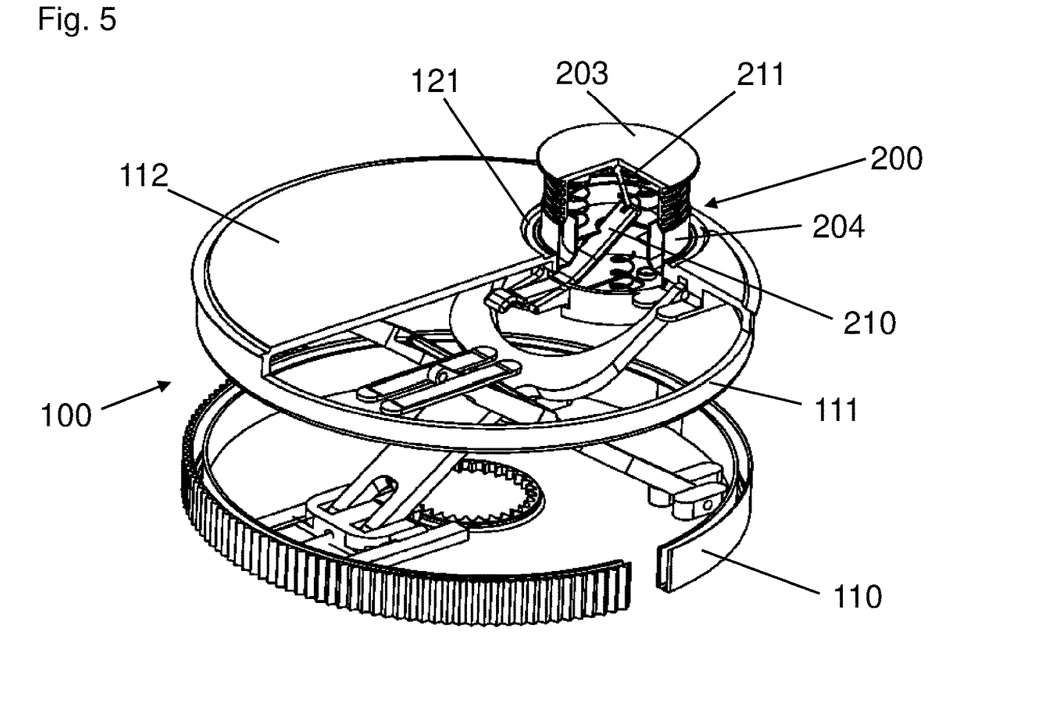
FIG. 5 illustrates a partially cut-away top view of the charging device with a scissor lift table of the charging device completely extended.
Figure 6:
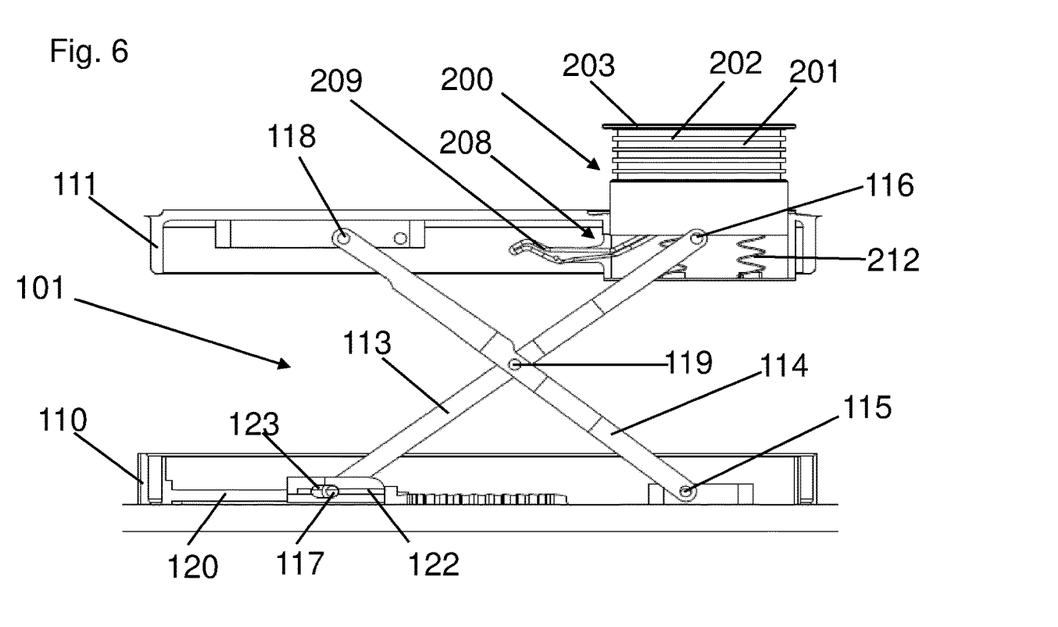
FIG. 6 illustrates a cross-sectional view of the charging device as shown in FIG. 5.

The design of charging device 100 is particularly apparent in FIGS. 5 and 6. Charging device 100 is made up of (i) a lifting device that is designed as scissor lift table 101 and (ii) contacting unit 200 that is situated at scissor lift table 101 and position-able with respect to scissor lift table 101. Contacting unit 200 includes electrical contact units in the form of electrical contact rings 201.

Scissor lift table 101 illustrated here has a circular base frame 110, and a likewise circular top frame 111 that forms a flat platform 112. The two bearings of two scissor levers 113, 114 having an equal length are respectively situated at base frame 110 and top frame 111. In the middle of their respective longitudinal extensions, the two scissor levers 113, 114 are situated on a shared axis 119 so as to be rotatable relative to one another.

Scissor lever 113 is supported at base frame 110 in a floating bearing 117 and at top frame 111 in a locating bearing 116. Scissor lever 114 is supported at base frame 110 in a floating bearing 115 and at top frame 111 in a locating bearing 118. Scissor levers 113, 114 are horizontally movably guided within floating bearings 117, 118, respectively. Scissor lever 113 supported in floating bearing 117 of base frame 110 may be horizontally displaced via a motor-driven threaded spindle 120. For this purpose, lower floating bearing 117 has a carriage 122 into which a thread is introduced. This thread extends on threaded spindle 120, which is driven by an electric motor (not shown), and thus moves carriage 122 with great force, as a result of which the electric motor may be designed with relatively small dimensions.

The resulting movement of scissor levers 113, 114 relative to one another is also transferred to locating bearing points 116, 118 of scissor levers 113, 114, respectively, at top frame 111, as a result of which top frame 111 together with platform 112 may be raised or lowered parallel to base frame 110.

Platform 112 has a circular recess 121 from which contacting unit 200 may extend. Contacting unit 200 has an essentially cylindrical base body 204 made of an insulation material, with multiple electrical contact rings 201 situated one on top of the other at the circumferential surface of base body 204. Contact rings 201 are provided to establish electrical connections with mating contact elements at an electrically powered motor vehicle in order to transfer electrical energy, preferably for charging traction batteries, to the motor vehicle.

Base body 204 of contacting unit 200 has a lid-like elevated ledge (or cover-like balcony) 203, situated so as to protrude laterally above contact rings 201. Elevated ledge 203 protects contact rings 201 from soiling when contact rings 201 have moved out of the protected area of charging device 100 but have not yet latched into receiving device 300 on the motor vehicle side (illustrated in FIGS. 7, 8, 9, 10, and 11). Falling objects, rain, snow, or dust thus do not fall on contact rings 201, but at most land on contacting unit 200 or pass by contacting unit 200, where they do not interfere with the charging operation.

Figure 11:
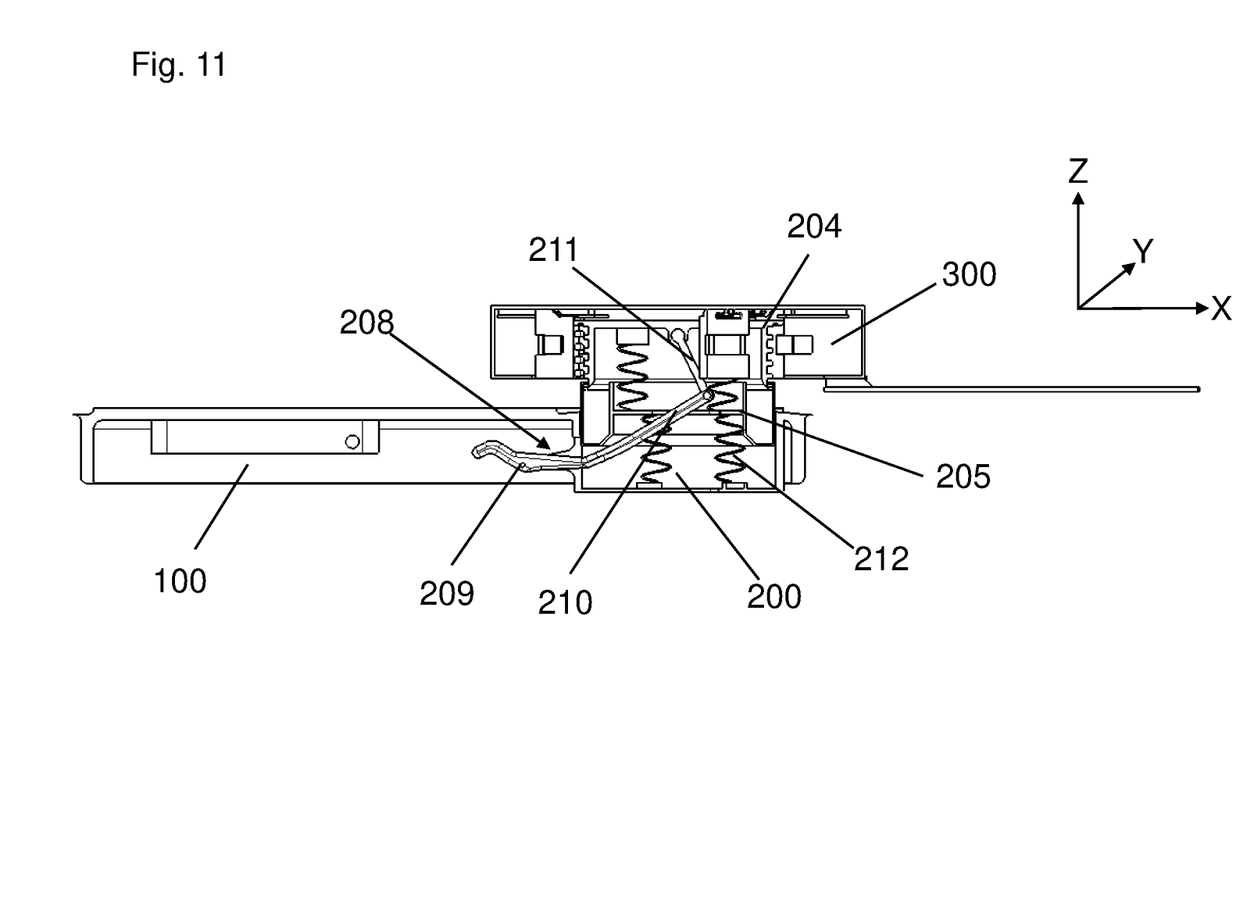
FIG. 11 illustrates a cross-sectional view of the contacting unit of the charging device and receiving device.

As illustrated in FIG. 11, base body 204 of contacting unit 200 is connected to top frame 111 of lifting device 101 of charging device 100 via multiple springs 212. The position of contacting unit 200 relative to platform 112 of lifting device 101 is controlled via a movably mounted swivel lever 208 that occasionally interacts with the scissor lever mechanism. For this purpose, swivel lever 208 is pivotably supported at top frame 111 of charging device 100. The longer lever arm 210 of swivel lever 208 is connected to base body 204 of contacting unit 200 via a movably hinged coupling lever 211. As a result of swivel lever 208, in particular when scissor lift table 101 is raised from its base position in the rest position of charging device 100, contacting unit 200 extends from platform 112 in advance, and in addition the raising of platform 112 from the base position of scissor lift table 101, which is unfavorable with regard to the action of force, is simplified.

It may advantageously be provided that base frame 110 of scissor lift table 101 is recessed into the floor of a building, or into the ground when outdoors. In this way, charging device 100 may also be integrated into public spaces.

For initiating a transfer of energy, contacting unit 200 of charging device 100 is initially led to receiving device 300 (illustrated in FIGS. 7, 8, 9, 10, and 11) which is situated at the motor vehicle (not shown). Contacting unit 200 is then mechanically and electrically connected to receiving unit. The vertical approach of contacting unit 200 to receiving device 300 at the base surface of the motor vehicle is brought about by the favorable relationship between the flat starting height and the maximum achievable working height, primarily by a movement of scissor lift table 101.

Various adjustment positions of charging device 100, and in particular of scissor lift table 101 and contacting unit 200, are illustrated in FIGS. 1, 2, 3, 4, 5, and 6.

Figure 1:
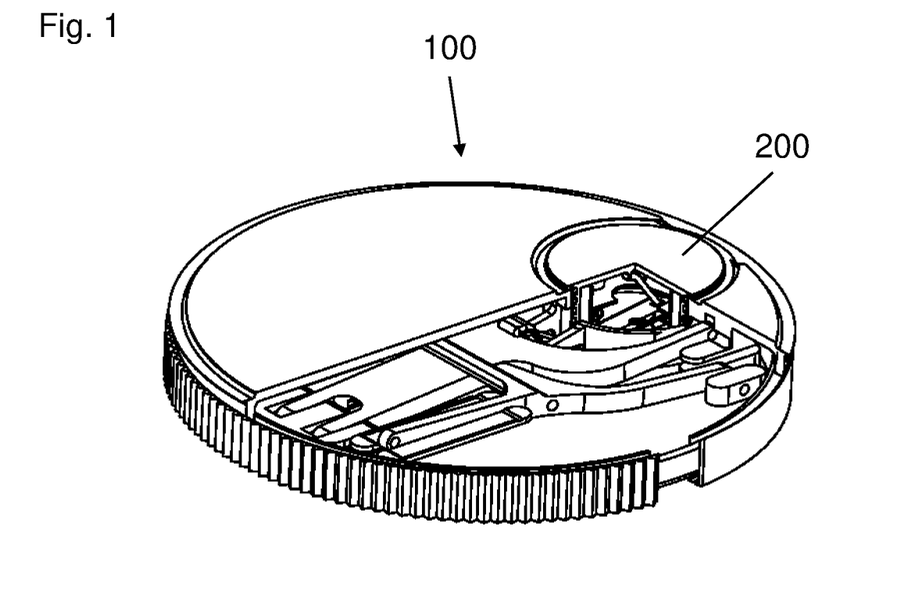
FIG. 1 illustrates a partially cut-away top view of a charging device of the system.
Figure 2:
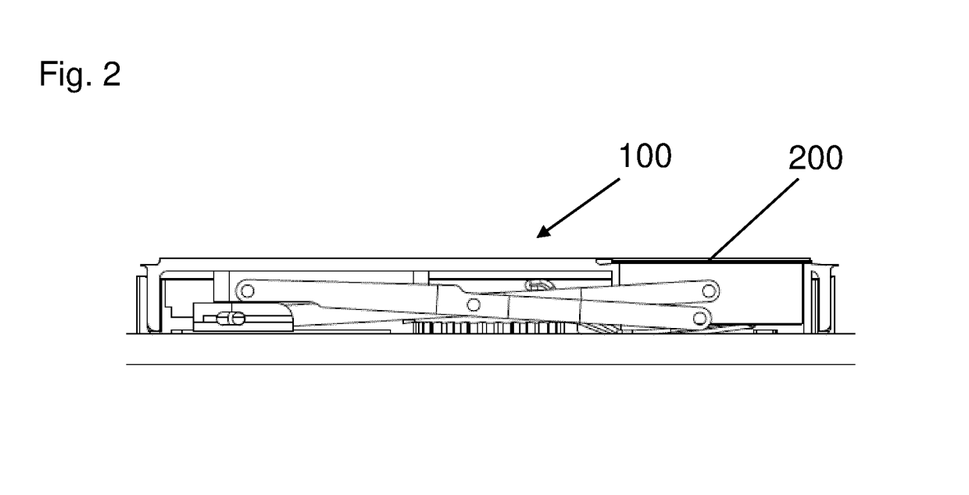
FIG. 2 illustrates a cross-sectional view of the charging device as shown in FIG. 1.

FIGS. 1 and 2 show two illustrations of charging device 100 in its rest position. Platform 112 of scissor lift table 101 and top frame 111 are situated close to base frame 110 and contacting unit 200 is retracted into top frame 111 of charging device 100. The components of charging device 100 are thus protected from soiling and damage.

Figure 3:
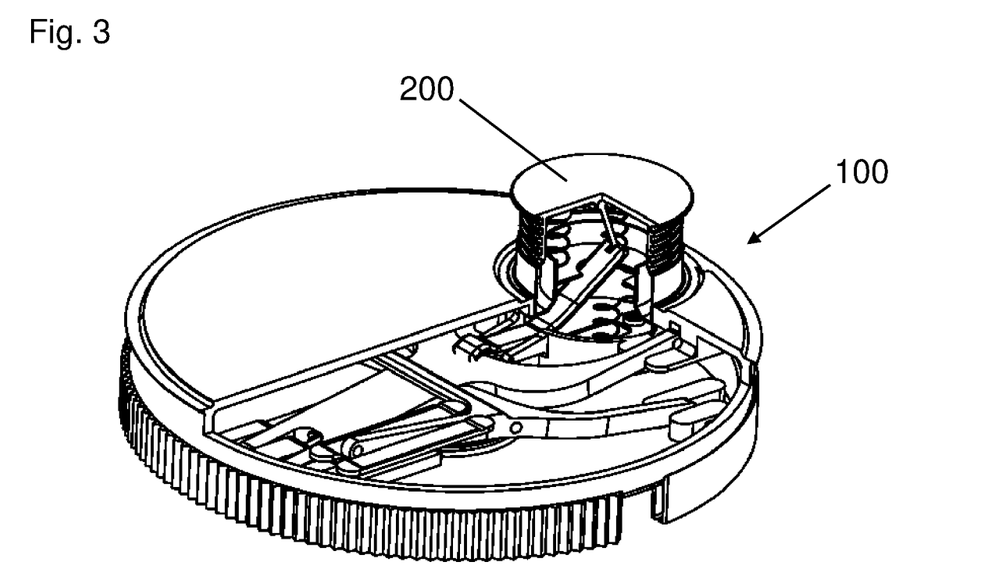
FIG. 3 illustrates a partially cut-away top view of the charging device with a contacting unit of the charging device being partially extended.
Figure 4:
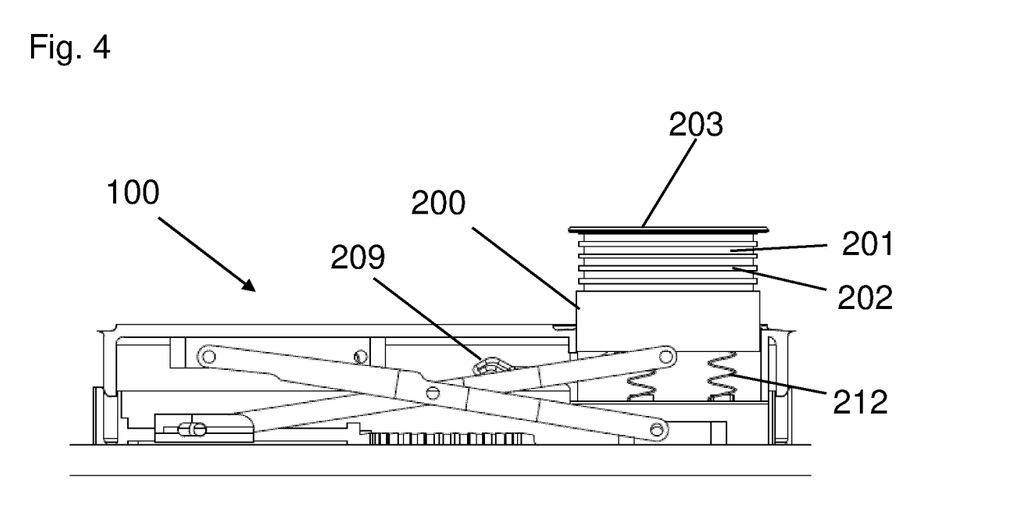
FIG. 4 illustrates a cross-sectional view of the charging device as shown in FIG. 3.

FIGS. 3 and 4 show a charging device 100 that is ready for use for charging the motor vehicle. Scissor levers 113, 114 of scissor lift table 101 have moved slightly out of their rest position, so that platform 112 of scissor lift table 101 is slightly raised. In this position of scissor lift table 101, contacting unit 200 is already completely extended out of the frame of charging device 100, with shorter lever arm 209 of swivel lever 208 just barely resting on scissor lever 113 of scissor lift table 101.

In this state, an equilibrium exists between the force of gravity of contacting unit 200 and the elastic force of springs 212. In, the design, it must be ensured that the elastic force of this equilibrium is achieved as precisely as possible when scissor lift table 101 is optimally extended (i.e., still has reserves at the top and at the bottom for subsequent movements of contacting unit 200). If scissor lift table 101 is now moved further upwardly, then shorter lever arm 209 of swivel lever 208 loses contact with the counter-bearing and simply travels along with it. In contrast, if scissor lift table 101 is now moved downwardly, then shorter lever arm 209 contacts the support surface of scissor lever 113. In this case, due to the lever ratio, the movement is converted from a movement with little distance and great force at the left side of swivel lever 208 into a movement with great distance and little force. In this way, contacting unit 200 is retracted in the vertical direction completely into frames 110, 111 of charging device 100 by swivel lever 208 and coupling lever 211, over a relatively short distance.

In the illustration in FIGS. 5 and 6, the system is extended completely, i.e., up to the maximum height, and shorter lever arm 209 of swivel lever 208 simply hangs freely at the left end. Platform 112 of scissor lift table 101 and contacting unit 200 move in parallel in this area.

Figure 7:
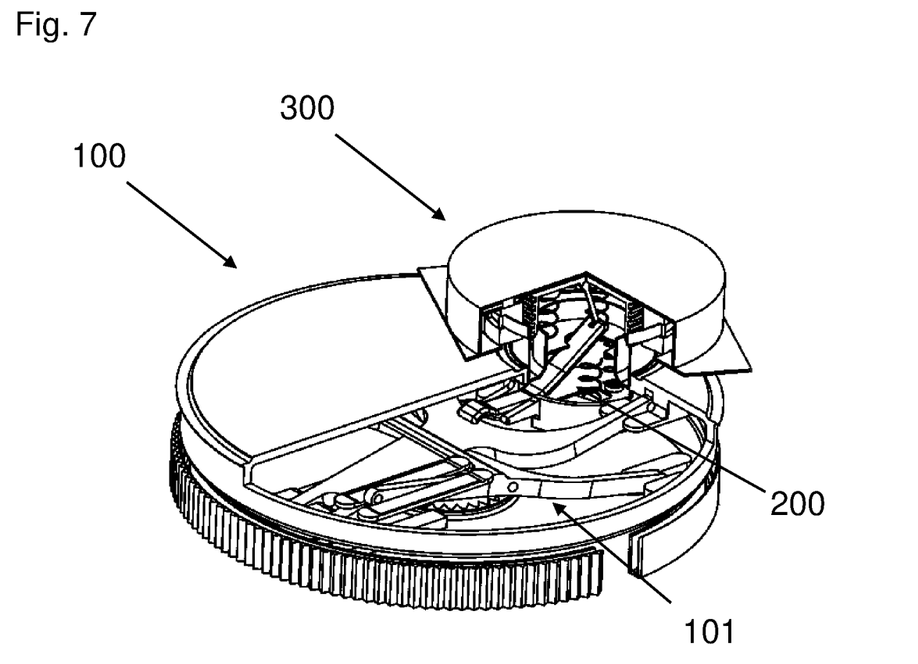
FIG. 7 illustrates a partially cut-away top view of the charging device and a receiving device of the system with the contacting unit of the charging device being received within the receiving device, the receiving device being for use on a vehicle side.
Figure 8:
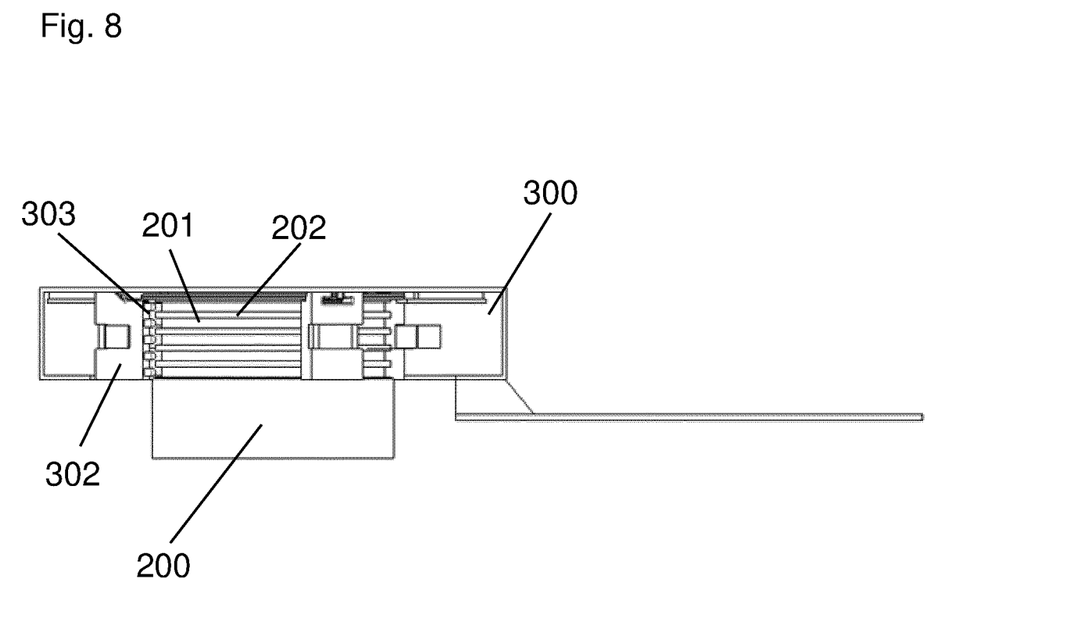
FIG. 8 illustrates a cross-sectional view of the receiving device connected to the contacting unit of the charging device.

FIGS. 7, 8 and 11 each show a sectional view of contacting unit 200 and receiving device 300 attached thereto which is part of a motor vehicle (not shown). FIG. 7 shows this arrangement at charging device 100, illustrated in a partial cross section. It is apparent that scissor lift table 101 is raised exactly enough so that contacting unit 200, which is extended from scissor lift table 101, is inserted into receiving device 300 situated at the motor vehicle at a fixed height.

The operating principle of the mechanism provided for raising contacting unit 200 is illustrated by the sectional view in FIG. 11. Contacting unit 200 is supported on multiple springs 212, and thus allows compensation for tolerances and subsequent movements of the motor vehicle, in particular in the Z direction as well as in the X/Y directions, and upon rotation about the three spatial axes. This design provides an excellent ratio of the overall height requirements to the adjustment range. A height factor of five to six times the installation height is achievable here.

As a result of springs 212, contacting unit 200 is already pushed out in advance when scissor lift table 101 is raised only slightly. The movement is restrained by swivel lever 208, which with its shorter lever arm 209 rests on an area of scissor lever 113, and in the last stage of coming together thus draws contacting unit 200 into the frame of scissor lift table 101 in order to hold it in a space-saving manner, and in particular to protect it.

During the extension, contacting unit 200 is pushed out by the force of springs 212 until an equilibrium is established between the force of gravity and the elastic force. Beginning at this point in time, contacting unit 200 travels at a constant distance from platform 112 of scissor lift table 101. Shorter lever arm 209 hangs freely in space until the height once again falls below a certain value, and shorter lever arm 209 rests on contacting unit 200 and thus draws it downwardly into platform 112 via coupling lever 211.

A further important component of contacting unit 200 is a protective collar 205. Protective collar 205, on the one hand, protects from soiling and, on the other hand, represents an intermediate level for springs 212.

The electrical connection of contacting unit 200 is not illustrated here. It is advantageous to simply provide a cable here, whose litz wires are fixed to contact rings 201, particularly preferably distributed uniformly around their circumference. Various approaches for an automatic X and Y positioning of contacting unit 200 are possible and known;

however, their details are not the subject matter of the present description. For example, an automatic motorized adjustment may be provided, using a sensor control system.

Figure 9:
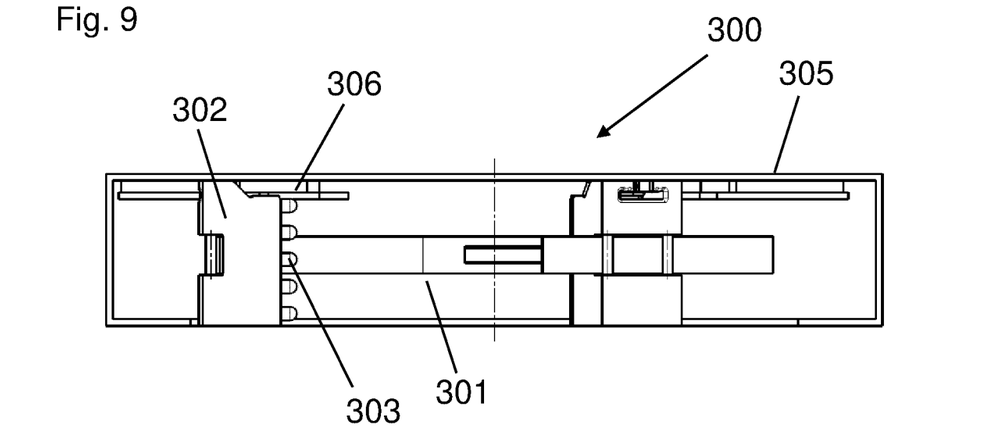
FIG. 9 illustrates a cross-sectional view of the receiving device on the vehicle side.
Figure 10:
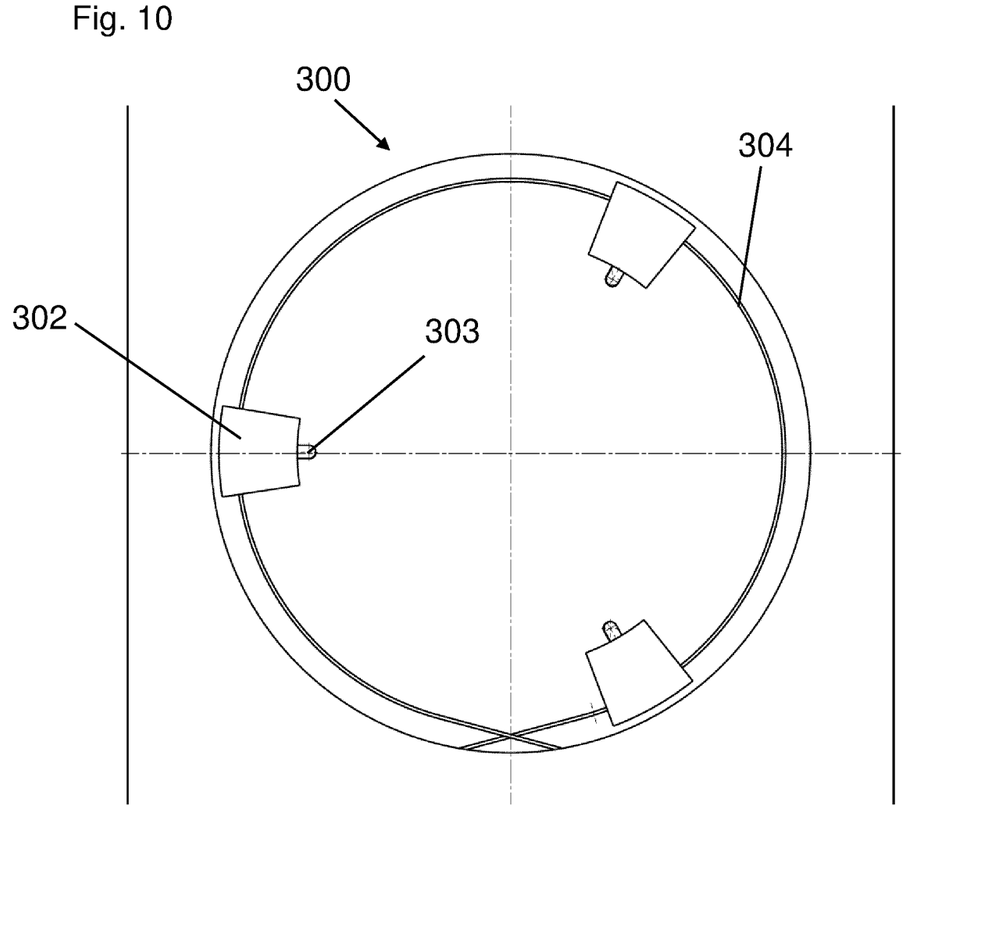
FIG. 10 illustrates a longitudinal section of the receiving device on the vehicle side.

FIG. 8 illustrates the electrical and mechanical connection between contacting unit 200 and receiving device 300 on the motor vehicle side. Details of receiving device 300 are illustrated in FIGS. 9 and 10.

Receiving device 300 on the motor vehicle side includes a cylindrical housing 305 whose top side is closed and whose bottom side has an accessible receiving chamber 301. At least three contact elements 302 are symmetrically arranged around receiving chamber 301 (FIG. 10). Each of contact elements 302 has multiple contact pins 303 situated one on top of the other, which may establish electrical connections with all electrically assigned contact rings 201 of contacting unit 200.

Contact elements 302 of receiving device 300 are guided on tracks 306 from above, from below, or on both sides (FIG. 9), and by way of example are moved here by an elastic metal strip 304. Elastic metal strip 304 is shaped to form a ring whose diameter in the tension-free state is much larger than the diameter of contacting unit 200 on the motor vehicle side.

In the relaxed state, elastic metal strip 304 thus draws contact elements 302 outwardly. If metal strip 304 is now contracted in the manner of a loop, for example driven by an electric motor (not shown), then when metal strip 304 moves, contact elements 302 are also moved inwardly along their tracks 306. As a result, contact elements 302 approach contacting unit 200 that is inserted into receiving chamber 301. Contact pins 303 are thus situated at contact elements 302 in such a way that they approach contact rings 201 of contacting unit 200 from the outside (FIG. 8). Contact rings 201 themselves are separated from one another by plastic ribs 202 and are thus also shifted inwardly with protection from contact.

All conductors present in the cable are connected in each case to contact pins 303 at each contact element 302. Contact pins 303 are in each case situated one on top of the other on contact elements 302 and are elastically supported to ensure a uniform contact force at all contact rings 201. In addition, contact elements 302 each have beveled support surfaces which ensure that contacting unit 200 in its vertical Z position is uniformly held and fixed in place.

Thus, as soon as the at least three contact elements 302 on the motor vehicle side have fixed contacting unit 200, the overall system is brought into a position in which contacting unit 200 simply drops downwardly after the fixing is released. This ensures that on the motor vehicle side, a decoupling may take place at all times and the charging system never hinders the motor vehicle from driving away.

To assist with such an emergency release, two means are provided at charging device 100 via which contacting unit 200, fixed in receiving device 300, may be mechanically pre-tensioned in an axial direction. These means may be used either individually or as illustrated here, in combination with one another.

Springs 212 are used as the first means. An elongated hole 123, apparent in FIG. 6, in carriage 122 that is used to drive scissor lift table 101 is provided as a second means. Elongated hole 123 allows the arrangement of scissor levers 113, 114 to release. As a result, the weight force of scissor lift table 101 axially pre-tensions contacting unit 200 that is fixed in receiving device 300.

When contacting unit 200 is moved into position and held by the motor vehicle, scissor lift table 101 may still be moved downward slightly. In the process, springs 212 are elongated, but contacting unit 200 remains securely in position. When contacting unit 200 is now released on the side of receiving device 300 at the motor vehicle, scissor lift table 101 slides into elongated hole 123 from right to left (in the illustration in FIG. 6) and contacting unit 200 drops down slightly into springs 212. Receiving chamber 301 of receiving device 300 is thus free, and the motor vehicle may be driven away.

LIST OF REFERENCE NUMERALS 100 charging device
101 scissor lift table (lifting device)
110 base frame
111 top frame
112 platform
113, 114 scissor lever
115, 116 fixed (locating) bearing
117, 118 floating bearing
119 common axis
120 threaded spindle
121 recess
122 carriage (slide)
123 elongated hole (slot)
200 electrical contacting unit of the charging device
201 electrical contact rings of the contacting unit
202 plastic ribs
203 elevated ledge (cover)
204 base body
205 protective collar (sleeve)
208 swivel (swing) lever
209 shorter lever arm
210 longer lever arm
211 coupling lever
212 elastic element, springs)
300 receiving device
301 receiving chamber of the receiving device
302 electrical contact element of the receiving device
303 electrical contact pins of the contact elements of the receiving device
304 elastic (resilient) metal strip
305 housing
306 tracks (rails)

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for conductively charging a motor vehicle, comprising:
    a charging device having a contacting unit and a lifting device operable for axially moving the contacting unit between retracted and extended positions;
    a receiving device having a receiving chamber for receiving the contacting unit inserted therein when the contacting unit is moved to an extended position;
    wherein the contacting unit has a cylindrical or truncated cone body and includes an electrical contact ring extending around a lateral surface of the body of the contacting unit; and
    the receiving device includes a radially position-able electrical contact element along the receiving chamber, the contact element is mechanically connected to an elastic loop and is radially position-able between radial positions by the elastic loop being relaxed and tensed, and in one of the radial positions while the contacting unit is inserted into the receiving chamber, the contact element electrically contacts the contact ring and mechanically fixes the contacting unit to the receiving device inside the receiving chamber.

2. The system of claim 1 wherein:
the contacting unit includes a plurality of electrical contact rings spaced apart from one another and extending around the lateral surface of the body of the contacting unit.

3. The system of claim 2 wherein:
the receiving device includes a plurality of radially position-able electrical contact elements spaced apart around the receiving chamber, and the plurality of contact elements are mechanically connected to the elastic loop and are radially position-able between the radial positions by the elastic loop being relaxed and tensed.

4. The system of claim 1 wherein:
the receiving device includes three radially position-able electrical contact elements spaced apart around the receiving chamber, and the three contact elements are mechanically connected to the elastic loop and are radially position-able between the radial positions by the elastic loop being relaxed and tensed.

5. The system of claim 1 wherein:
the lifting device is a scissor lift table that is adjustable to retract and extend to axially move the contacting unit between the retracted and extended positions.

6. The system of claim 1 wherein:
the receiving device is arranged on the motor vehicle.

7. The system of claim 1 wherein:
the radially positioning of the contact element of the receiving device is controllable by a vehicle-side controller.

8. The system of claim 1 wherein:
the charging device is further configured to mechanically preload in an axial direction the contacting unit inserted in the receiving chamber of the receiving device.

9. The system of claim 8 wherein:
the charging device includes an elastic element for mechanically preloading in the axial direction the contacting unit inserted in the receiving chamber of the receiving device.

10. The system of claim 9 wherein:
the elastic element is a spring.

11. The system of claim 9 wherein:
the lifting device is a scissor lift table having scissor levers; and
the elastic element is mechanically pretensioned by an adjustment movement of the scissor lift table.

12. The system of claim 11 wherein:
the mechanical pre-tensioning of the elastic element is produced by a mechanical decoupling of a scissor lever from a carriage that moves the scissor lift table.

13. The system of claim 12 wherein:
the carriage has an elongated hole in which the scissor lever is supported.

14. The system of claim 11 wherein:
the contacting unit in conjunction with the elastic element is movable in advance with respect to the scissor lift table by a swivel lever that is coupled to the scissor levers.

15. The system of claim 1 wherein:
the charging device further includes an elastic unit connecting the contacting unit to the lifting device.

16. The system of claim 1 wherein:
the contacting unit in the retracted position is housed within a frame of the charging device.

17. A system for conductively charging a motor vehicle, comprising:
a charging device having a contacting unit and a lifting device operable for axially moving the contacting unit between retracted and extended positions;
a receiving device having a receiving chamber for receiving the contacting unit inserted therein when the contacting unit is moved to an extended position;
wherein the contacting unit has a cylindrical or truncated cone body and includes an electrical contact ring extending around a lateral surface of the body of the contacting unit;
the receiving device includes a plurality of radially position-able electrical contact elements spaced apart around the receiving chamber, when the contact elements are in one radial position while the contacting unit is inserted into the receiving chamber the contact elements electrically contact the contact ring and mechanically fix the contacting unit to the receiving device inside the receiving chamber;
the contact elements are mechanically connected to one another via an elastic loop; and
the elastic loop is an elastic metal strip.

18. A system for conductively charging a motor vehicle, comprising:
a charging device having a contacting unit and a lifting device operable for axially moving the contacting unit between retracted and extended positions;
a receiving device having a receiving chamber for receiving the contacting unit inserted therein when the contacting unit is moved to an extended position;
wherein the contacting unit has a cylindrical or truncated cone body and includes an electrical contact ring extending around a lateral surface of the body of the contacting unit;
the receiving device includes a plurality of radially position-able electrical contact elements spaced apart around the receiving chamber, when the contact elements are in one radial position while the contacting unit is inserted into the receiving chamber the contact elements electrically contact the contact ring and mechanically fix the contacting unit to the receiving device inside the receiving chamber; and
the contact elements of the receiving device are mechanically connected to one another via an elastic loop and are radially position-able between radial positions by the elastic loop being relaxed and tensed.

* * * * *